United States Patent Office 3,623,888
Patented Nov. 30, 1971

3,623,888
STABLE LIQUID SHORTENING AND METHOD
OF PRODUCING SAME
Edward J. Reid, Brea, Calif., assignor to Hunt-Wesson
Foods, Inc., Fullerton, Calif.
No Drawing. Continuation-in-part of application Ser. No.
660,181, Aug. 14, 1967. This application Apr. 24, 1970,
Ser. No. 31,770
Int. Cl. A23d 5/00
U.S. Cl. 99—118                                    18 Claims

ABSTRACT OF THE DISCLOSURE

A true pourable, liquid shortening which remains clear down to temperatures of about 60° F. and produces high and stabilized consistent volume baked goods irrespective of prebaking batter temperature is prepared by combining a liquid triglyceride oil, a crystal inhibitor and an emulsifying amount of an acyl lactylic acid mixture, a fatty acid mono-diglyceride and a free saturated fatty acid, containing 16 to 22 carbon atoms.

This is a continuation-in-part of my copending application Ser. No. 660,181, filed Aug. 14, 1967, entitled Liquid Shortening and Method of Producing Same and now abandoned.

BACKGROUND OF THE INVENTION

Field of the invention

The present invention relates to a new and improved stable liquid shortening and to methods of preparing and utilizing the shortening in the production of high quality baked goods of predictable and high volume response.

Description of the prior art

Liquid shortenings are mixtures of edible oils and emulsifiers and possess markedly superior baking qualities over salad oils and solid vegetable oils. Liquid shortening stability is a serious problem; when all or part of the emulsifier separates out of the edible oil in a shortening, the functionable or baking qualities of the shortening are adversely affected. Plastic or semisolid shortenings are notably more stable than liquid shortening, and for this reason they are commercially successful, whereas liquid shortenings have been anything but commercially successful. However, in spite of their stability shortcomings, liquid shortenings offer many conveniences and advantages to the consumer in easier handling, storage, measuring and direct mixing into batters as compared to the procedures utilized in baking with plastic shortenings. Further, rigidly controlled crystallization and tempering are required during the manufacture of plastic shortenings to obtain the desired crystal structure of the various compounds, while liquid shortenings can be more easily prepared without regard to crystal structure. Furthermore, the semisolid plastic products are not readily adaptable to large scale automated baking procedures. Further, the plastic shortenings are difficult to measure accurately, and have a strong tendency to adhere to the measuring utensils, such as spoons, knives, and cups, and to mixing utensils, such as the mixing bowl and blades in a mechanical mixer, which makes the utensils difficult to clean and which makes uniform batter-mixing more difficult.

Despite the obvious advantages of liquid shortenings, they have not been utilized in any great amounts since the initial pourable fluid shortening products introduced onto the market had many unacceptable limitations. These pourable shortenings, which are not liquid shortenings as known in the art, were room temperature suspensions of solid triglycerides and solid emulsifiers in liquid triglyceride base stocks. These shortenings were pourable because the solids in suspension (predominantly $C_{16}$ to $C_{18}$ saturated fatty acid triglycerides) were in the beta crystal phase, the highest melting crystalline form of these polymorphic compounds. The other crystalline phases of these solid triglycerides and solid emulsifiers could not be used in vegetable oils to produce a pourable shortening because they formed lattices in the pourable shortening which thicken the shortening into a gel-like composition making the shortening nonpourable. The processing of these pourable shortenings was difficult because the beta crystallization processing of the solid triglycerides and solid emulsifiers was critical as to time and temperature. These pourable shortenings, while pourable at room temperature, were not clear at room temperature and were very sensitive to temperature becoming very viscous below 60° F. Further, at temperatures over 90° F., the beta phase solid triglycerides and emulsifiers in the pourable shortening tended to irreversibly melt, and upon cooling recrystallized into various crystalline phases resulting in a permanent loss of fluidity to the shortening. The liquid shortenings that have been prepared had a marked tendency to become cloudy at room temperatures (crystallization of the solid triglycerides and solid emulsifiers), and the cloudy material would settle to the bottom of the shortening's container. This not only adversely affected the marketing appearance of the shortening, but more seriously brought about a decrease in the emulsifier concentration in the shortening which in turn caused a marked deterioration in the liquid shortening's functional or baking qualities.

It is therefore an object of this invention to provide a true, pourable, stable, clear liquid shortening.

Another object is the provision of a liquid shortening composition which on incorporation into batters provides predictable baking volume response unaffected by prebaking batter temperature.

A further object is the provision of a pourable shortening composition that is stable and clear at temperatures above 60° F. and that on incorporation into batters provides cakes exhibiting good functionality and stability at baking temperature.

Yet another object of this invention is the provision of a liquid shortening that can be readily prepared in a few, simple steps without need for controlling the crystallinity of the emulsifiers. More particularly it is an object to provide a liquid shortening that is easy to make, conveniently packaged, handled and stored at ambient temperature without fear of deterioration of quality and which can be utilized in preparing baked goods with fairly imprecise control of batter temperature to yield finished baked products of a predictable volume and quality response.

A still further object of this invention is the provision of a liquid, pourable shortening capable of single-stage mixing preparation of baking batters, which when baked, results in cakes of optimum eating quality, exhibiting high volume, fine grain, texture and absence of tunnels.

These and other objects and many attendant advantages of the invention will become better understood by reference to the following detailed description of preferred embodiments of the invention.

SUMMARY OF THE INVENTION

In accordance with the present invention, a normally clear liquid shortening is provided enabling the efficient production of a wide variety of high quality, edible, air or chemically leavened baked goods of predictable volume response. These desired results are attained by incorporating into a base liquid edible oil an emulsifying amount of an acyl lactylic acid mixture, a fatty acid mono-diglyceride and a minor amount of a saturated long chain fatty acid mixture. The shortening of the invention may further and preferably include a small amount of a crystal inhibitor and an antioxidant.

It is to be understood that each ingredient of the shortening is an edible grade material treated to remove objectionable odors and nondesired toxic fractions. Furthermore many materials in their commercial edible grade form are actually mixtures. These commercial mixtures are usually of closely related compounds such as stearic and palmitic acids which perform as well as the pure compounds and are intended when referred to hereinafter.

The base oil for the shortening is suitably an edible grade liquid oil of animal, marine, or vegetable origin, preferably a triglyceride vegetable oil such as sunflower oil, winterized cottonseed oil, corn oil, peanut oil, safflower oil, soya bean oil or the like. Soya bean oil is readily available in large quantities and at a reasonable cost and is most suitable for use in the shortening of the invention. Particularly preferred are the finished oils such as refined unhydrogenated, finished (deodorized and bleached) soya bean oil.

The first ingredient of the emulsifier of the shortening of the invention comprises a relatively small amount of an acyl lactylic acid mixture dissolved in the base oil. The acyl lactylates or lactylic acids are of the general formula:

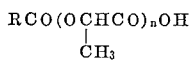

in which RCO is an acyl radical of a fatty acid containing 16 to 24 carbon atoms and $n$ is a number between 1 and 6, preferably between 1 and 3 representing the average acyl groups present. Generally the acyl lactylic acids are a mixture of acyl monolactylic acids and acyl polylactylic acids having from 1 to 6 lactylic groups. In such mixtures the acyl mono-lactylic acids will constitute from about 90% to about 70% by weight of the mixture and the acyl polylactylic acids will constitute from about 10% to about 30% of the mixture; preferably about 20%. A commercial lactylic stearate product known as Marvic Acid (Glidden Co.) which contains an acyl moiety including 89% stearic and 11% palmitic acids and $n$ is about 1.3 can be used in the present invention. However, a far superior liquid shortening has been prepared from an acyl lactylic acid mixture containing about 80% acyl mono-lactylic acid and about 20% of acyl polylactylic acids. In this mixture the acyl moiety is prinicipally palmityl and stearyl in the weight ratio of from about 5 parts to about 1 part palmityl to about 1 part stearyl; preferably about 3 parts palmityl to about 2 parts stearyl. The acyl lactylic acid mixtures are typically present in an amount of about 2% by weight. However, good results are also obtained with amounts as low as 1% and amounts above 5% are usually not required.

A further component of the emulsifier system of the liquid shortening of the invention comprises 0.5 to 5% of a fatty acid mono-diglyceride mixture. Though the mixture may contain as much as 90% monoglycerides and still be functionally effective, better sustained clarity is achieved when the monoglycerides are present in amounts below 70% and preferably the mono-diglyceride is a concentrate containing 20% to 60% mono-glycerides, no more than 8% to 10% triglycerides and 20% to 60% diglycerides. The acyl content of the glycerol esters preferably comprises about 20% to 40% saturated $C_{14}$ to $C_{22}$ fatty acids, 20% to 40% monounsaturated fatty acids containing at least 18 carbon atoms and 20% to 40% of diunsaturated fatty acids of at least 18 carbon atoms.

Products of such content are provided by interesterifying 10% to 30% of glycerine with 80 to 86 I.V. triglyceride oils. A preferred mono-diglyceride concentrate containing 38% to 42% monoglycerides and no more than 8% triglyceride is prepared by reacting 20% glycerol and an 80 to 86 I.V. cottonseed oil in the presence of NaOH at 170° C. to 220° C. The resultant concentrate is not completely solid at ambient temperatures.

Initial evaluation of a liquid shortening containing stearyl lactylic acid and mono-diglyceride emulsifiers in a salad oil base gave a fairly wide and unpredictable response in carefully controlled bakings. On further study, it was discovered that an interaction exists between batter temperature (i.e., the final prebaking temperature of the batter) and cake volume response. After investigation of numerous additives in an attempt to eliminate the problem, it was discovered that addition of 0.25% to 2% of a saturated fatty acid mixture, containing fatty acids having from 16 to 22 carbon atoms, essentially stabilizes cake volume response. In the preferred embodiment of the present invention the saturated fatty acid mixture contains principally palmitic acid and stearic acid in the weight ratio of about 1 part to about 5 parts palmitic acid to about 1 part stearic acid, preferably about 3 parts palmitic acid to about 2 parts stearic acid.

To assure sustained clarity a small amount of a crystal inhibitor may be added. Preferred cloud inhibitors are the essentially esterified polyglycerol esters of $C_6$ to $C_{18}$ predominantly saturated fatty acids. These products are prepared by esterifying glycerol polymers containing principally products formed of 3 to 5 glycerol molecules though there may be some products of higher and lower degree of polymerization.

A preferred material is prepared by esterifying such polyglycerols with a mixture of stearic, oleic and coconut oil fatty acids typically containing about 10–11% lauric acid, 1–2% capric acid, 0.5–1% caprylic acid, 5.5–7.0% myristic acid, 15.5–19% palmitic acid, 30–40% stearic acid, 20–25% oleic acid, 1–2% palmitoleic acid and a trace amount typically less than 0.5% of caproic acid.

A crystal inhibiting amount of the polyglycerol ester cloud inhibitor will be added generally within the range of about 0.05 to 0.5%. An amount of 0.1% has been found effective to inhibit crystal formation down to 60° F. though other amounts may be added dependent on the cloud test desired and the particular composition of the shortening.

As illustrative of a preferred formulation of the liquid shortening of the invention, the following ingredients are mixed at a temperature above 80° C., typically at about 80–100° C., for about 15 minutes and then cooled to 80° F. in a tank or heat exchanger before packaging.

EXAMPLE 1

| Ingredients: | Amount, percent |
| --- | --- |
| Marvic acid (n=1.3) | 2 |
| Mono-diglyceride concentrate (20% glycerol-80 to 86 I.V. cottonseed oil) | 1.3 |
| Stearic-palmitic acids 50/50 | 0.5 |
| Polyglycerol ester crystal inhibitor | .1 |
| Preservative: | |
| Butyl hydroxy anisole (BHA) | 0.01 |
| Butyl hydroxy toluene (BHT) | 0.01 |
| Balance—deodorized unhydrogenated soya bean oil | 96.08 |

The liquid shortening product is clear and remains clear at temperatures of 65° F. or greater. The product can be cooled to 55° F. for short periods without the formation of any visible crystals or loss in any of the properties of the shortening. The product has a viscosity of salad oil and pours easily for measurement and blends easily into a dough during mixings. The product has excellent stability from crystallization and subsequent settling out. The ease of preparation is apparent, the additives being simply dissolved by heating the soya bean oil to a temperature at which the additives dissolve.

The following controlled experiments are offered to demonstrate the excellent baking qualities of the shortening of the invention. The white cake test utilized in the following evaluation experiments is for a richer type cake containing a high ratio of sugar to flour and is a rigorous performance test for a shortening.

EXAMPLE 2

A liquid shortening of the following composition was prepared as described:

| Ingredients: | Amount, percent |
|---|---|
| Acyl lactylic acid mixture containing 20% acyl polylactylic acid of from 2 to 6 lactylic groups (wherein acyl is palmityl and stearyl in the ratio of 3 parts by weight palmityl to 2 parts by weight stearyl) | 2 |
| Mono-diglyceride concentrate (20% glycerol-86-86 I.V. cottonseed oil) | 1.5 |
| Palmitic acid to stearic acid (3:2), fatty acid mixture | 1.0 |
| Polyglycerol ester crystal inhibitor | 0.1 |
| Preservatives (BHA and BRT) | .02 |
| Refined, unhydrogenated, finished soya bean oil | About 95.4 |

The refined unhydrogenated refined soya bean oil was heated to a temperature about 80° C. in a reaction vessel equipped with a mechanical stirrer. After the oil was heated to the requisite temperature, the acyl lactylic acid mixture, the mono-diglyceride concentrate, the fatty acid mixture, the crystal inhibitor, and the preservatives were added with stirring. The resulting mixture was stirred for twenty minutes and then cooled to 70° F. in a heat exchanger and packaged in clear flint bottles filled with nitrogen gas.

The liquid shortening product is clear and remains clear down to a temperature of about 60° F. The product can be cooled down to 55° F. for short periods without clouding or losing any of its desired shortening or baking properties. The product has the viscosity of a light salad oil and blends easily in mixing. The resulting liquid shortening has excellent shelf life and does not become cloudy during storage for a prolonged period of time.

The resulting liquid shortening possesses the same excellent baking qualities as the shortening prepared according to the method of Example 1. However, the resulting liquid shortening is far more stable than the liquid shortening of Example 1.

Comparable quality shortenings of sunflower oil, winterized cottonseed oil, corn oil, peanut oil and safflower oil can be prepared by the above described method.

EXAMPLE 3

A liquid shortening was prepared in accordance with the procedure of Example 2 utilizing the following ingredients:

| Ingredients: | Amount, percent |
|---|---|
| A mixture of acyl lactic acids containing 30% acyl polylactylic acids (wherein acyl is principally palmityl and stearyl in a weight ratio of 5 parts palmityl to 1 part stearyl) | 5 |
| Mono-diglyceride concentrate | 1 |
| Palmitic acid to stearic acid (5:1), fatty acid mixture | 2.0 |
| Polyglycerol ester crystal inhibitor | 0.2 |
| Preservatives (BHA and BHT) | About 0.015 |
| Refined, unhydrogenated finished soya bean oil | About 93 |

The resulting liquid shortening prepared from the above ingredients has stability and baking properties substantially similar to liquid sortening prepared according to the procedure of Example 2.

EXAMPLE 4

A liquid shortening is prepared from the following ingredients according to the procedure described in Example 2:

| Ingredients: | Amount, percent |
|---|---|
| Acyl lactylic acid mixture containing 10% acyl polylactylic acids (wherein acyl is principally palmityl and stearyl in the weight ratio of about 1 part palmityl to about 1 part stearyl) | 1 |
| Mono-diglyceride concentrate | 0.5 |
| Palmitic acid to stearic acid mixture, (2:1) | 0.25 |
| Polyglycerol ester crystal inhibitor | 0.02 |
| Preservative (BHA and BHT) | About 0.025 |
| Balance—refined unhydrogenated refined soya bean oil | About 98.0 |

EXAMPLE 5

A liquid shortening is prepared from the following ingredients according to the procedure described in Example 2:

| Ingredients: | Amount, percent |
|---|---|
| Acyl lactylic acid mixture containing 15% acyl polylactylic acids (wherein acyl is principally palmityl and stearyl in the weight ratio of about 3 parts palmityl to about 1 part stearyl) | 2.5 |
| Mono-diglyceride concentrate | 2 |
| Palmitic acid to stearic acid (3:1), fatty acid mixture | 1.5 |
| Polyglycerol ester crystal inhibitor | 2 |
| Preservative (BHA and BHT) | About 0.03 |
| Balance—refined, unhydrogenated, refined soya bean oil | About 92 |

Liquid shortenings of comparable quality to the above liquid shortening are prepared by employing sunflower seed oil, winterized cottonseed oil and safflower oil in place of soya bean oil in the above method.

EXAMPLE 6

A liquid shortening is prepared from the following ingredients according to the procedure described in Example 2:

| Ingredients: | Amount, percent |
|---|---|
| Acyl lactylic acid mixture containing 25% acyl polylactylic acid (wherein acyl is principally palmityl and stearyl in the weight ratio of about 4 parts palmityl to about 1 part stearyl) | 1.5 |
| Mono-diglyceride concentrate | 5 |
| Palmitic acid to stearic acid (1:1), fatty acid mixture | 0.5 |
| Polyglycerol ester crystal inhibitor | 0.15 |
| Preservative (BHA and BHT) | About 0.02 |
| Balance—refined, unhydrogenated, refined soya bean oil | About 93 |

EXAMPLE 7

The mixing bowl of a three-speed Hobart mixer was immersed in a constant temperature water bath. Standard white cakes were prepared by mixing for two minutes at speed No. 1 the following ingredients:

| Ingredients: | Grams |
|---|---|
| Cake flour | 364 |
| Granulated sugar | 472 |
| Nonfat milk solids | 36 |
| Salt | .9 |
| Baking powder | 20 |
| Cream of tartar | 5 |
| Liquid shortening | 170 |
| Water | 210 |

Additional water (54 grams) at 85° F. was added slowly to reduce batter viscosity as little as possible and the batter mixed for three more minutes at speed No. 1. In the third mixing stage, 27 grams of whole egg at 45° F. and 245 grams of egg white were added slowly and the batter mixed for three more minutes at speed No. 1.

Thereafter, 350 grams of batter were poured into paper lined, lightly greased, eight-inch diameter pans and baked for 24 minutes at 375° F.

The white cakes in each case had good eating characteristics, good texture and there was an absence of tunnelling. Shown below are the results indicating the interaction between final batter temperature and cake volume response and the manner this has been controlled according to the invention.

TABLE

| Fatty acid present in liquid shortening | Batter temperature response, volume (cc.) | | Volume chage 60°–75° F. (cc.) |
|---|---|---|---|
| | 60° F. | 75° F. | |
| None | 1,080 | 1,054 | 26 |
| Lauric | 1,105 | 1,064 | 41 |
| Oleic | 1,133 | 1,107 | 26 |
| Stearic-palmitic 50/50 | 1,135 | 1,130 | 5 |

It is apparent that the addition of cold eggs at 45° F. and warm water at 85° F. causes a loss in functionality. Though all three fatty acids offset this loss of functionality, and did give higher volumes than the control, oleic did not have a significant effect, lauric acid had a detrimental effect and only the stearic-palmitic acid mixture essentially stabilized the cake volume response. Statistical analysis of multiple samples showed that a cake volume difference of 24 cc. is a statitically significant difference at the 95% confidence level.

While not intending to be bound by theory, it is difficult to explain the beneficial effect of the higher saturated fatty acids on cake volume response. If it is postulated that the carboxyl group present in the lactylic acid ester weakens the gluten structure or denatures the egg protein, the addition of fatty acid would be expected to increase not lessen this effect. Furthermore, since oleic acid increases cake volume, this suggests carboxyl groups are beneficial in this respect. The stabilization phenomena cannot be simply related to saturation or melting point since lauric acid which is both saturated and has a higher melting point than oleic acid does not stabilize cake volume and at 75° F. the increase in volume is sharply reduced.

Furthermore, 75° F. is a much more realistic batter temperature for commercial usage in bakeries where room temperatues are frequently at that level due to heat losses from the nearby ovens. The ability to minimize the dependence of cake volume response on batter temperature is important in institutional bakeries since consistent quality products of consistent volume are necessary with a minimum of critical time scheduling and control. The liquid shortenings are particularly advantageous in semi-automated bakeries where the period of batter preparation and batter temperatures before baking vary widely. With the shortenings of the invention this variable may be ignored and uniform and high quality cakes consistently produced even when adding cold or warm ingredients to the batter.

The new liquid shortening will also provide the same high edible quality characteristics and predictable response when incorporated in other batters such as yellow cakes, chocolate cakes, spice cakes, biscuits, cookies, crackers, pastry and the like including ingredients well known in the industry.

The liquid shortening of the invention not only can be utilized in a wide variety of baked goods but also produces high quality cakes with single stage mixing of all the ingredients, avoiding the time-consuming and difficult multiple-stage mixing of the ingredients in a specified order. For example, the white layer cake ingredients of the previous example can be combined in a bowl and mixed for about 1½ minutes at low speed and 1½ minutes at high speed. After baking at 375° F. for 24 minutes, a high quality, high volume, eventextured white cake is produced.

The liquid shortening of the invention is most effectively utilized in commercial baking operations because of the ease with which the pourable product is handled and measured and the simple manner in which baking utensils it contacts may be cleansed. The ready dispersability of the shortening in flour batters eliminates the creaming step, which is necessary when a plastic shortening is used, and substantially simplifies prebaking preparation of the batters. Of significant importance is the sustained stability and clarity of the product at a wide variety of temperatures encountered in the preparation, distribution, storage and use of such products. Furthermore, stability and clarity in addition to assuring the consistent properties of each portion of the product is desirable in itself, providing a more visually acceptable product to the consumer than a creamy, dispersed product.

Again, it is to be remembered that the dispersion products have a tendency to settle out and destroy the balance of baking qualities of the shortenings. With the invention, the stabilized baking response, at prebaking temperature of the batter, is of substantial advantage in providing predictable and consistent high volume baked products.

It is to be understood that the foregoing relates to preferred features and embodiments of the invention and that numerous substitutions and alterations are permissible and possible without departing from the spirit and scope of the invention as defined in the following claims.

I claim:
1. A stable, clear, liquid, pourable shortening composition being stable and clear at temperatures above 60° F. comprising in combination:
   between about 90% and about 98% by weight of an edible liquid oil;
   between about 1% and about 5% by weight of an acyl lactylic acid mixture containing from about 10% to about 30% acyl polylactylic acids having from 2 to 6 lacylic groups, the acyl moiety being principally palmityl and stearyl in the weight ratio of about 1 to 5 parts palmityl to about 1 part stearyl;
   between about 0.5% and about 5% of a fatty acid mono-diglyceride;
   between about 0.25% and about 2% by weight of a fatty acid mixture containing principally palmitic acid and stearic acid in the weight ratio of about 5 parts to about 1 part palmitic acid to about 1 part stearic acid; and
   about 0.02% to 2% by weight of a polyglycerol ester crystal inhibitor.

2. The stable, clear, liquid, pourable shortening composition according to claim 1 wherein the edible liquid oil is vegetable oil.

3. The stable, clear, liquid, pourable shortening composition according to claim 2 wherein the liquid edible oil is refined, unhydrogenated, finished soya bean oil.

4. The stable, clear, liquid, pourable shortening composition according to claim 1 wherein the weight ratio of palmityl to stearyl in the acyl lactylic acid mixture is about 3 parts palmityl to about 2 parts stearyl.

5. The stable, clear, liquid, pourable shortening composition according to claim 1 wherein the weight ratio of palmitic acid to stearic acid in the fatty acid mixture is about 3 parts palmitic acid to about 2 parts stearic acid.

6. The stable, clear, liquid, pourable shortening composition according to claim 1 wherein the acyl lactylic acid mixture contains about 20% by weight of acyl polylactylic acids having from 2 to 6 lactylic groups, the balance being acyl mono-lactylic acids.

7. The stable, clear, liquid, pourable shortening composition according to claim 1 wherein the acyl lactylic acid mixture has an average of about 1.3 lactylic group per acyl moiety.

8. A shortening composition according to claim 1 in which about 1.3% of the fatty acid mono-diglyceride is present as the reaction product of about 10% to 30% glycerol and an 80 to 86 I.V. triglyceride oil.

9. A shortening composition according to claim 8 in which the triglyceride oil of the reaction product is 80 to 86 I.V. cottonseed oil and the fatty acid mono-diglyceride concentrate contains about 38% to 42% of monoglycerides and is not completely solid at ambient temperature.

10. A shortening composition according to claim 8 in which the triglyceride oil includes about 20% to 40% $C_{14}$ to $C_{22}$ saturated fatty acids, 20% to 40% of monounsaturated fatty acid of at least 18 carbon atoms and 20% to 40% of diunsaturated fatty acids containing at least 18 carbon atoms.

11. The stable, clear, liquid, pourable shortening composition according to claim 1 wherein the composition contains by weight about 1% of the free fatty acid mixture.

12. A shortening composition according to claim 1 in which about 0.1% of esters of a mixture of tri-, tetra-, and pentaglycerols and a mixture of predominantly saturated $C_6$ to $C_{18}$ fatty acids is present as the crystal inhibitor.

13. A shortening composition according to claim 12 in which the mixture of predominantly saturated $C_6$ to $C_{18}$ fatty acids are a mixture of stearic, oleic and coconut oil fatty acids.

14. A shortening composition according to claim 13 in which the mixture of predominantly saturated $C_6$ to $C_{18}$ fatty acids includes about 10% to 11% lauric acid, about 1% to 2% capric acid, about 0.5% to 1% caprylic acid, about 5.5% to 7% myristic acid, about 15.5% to 19% palmitic acid, about 30% to 40% stearic acid, and about 20% to 25% oleic acid, about 1% to 2% palmitoleic acid and not more than about 0.5% of caproic acid.

15. A shortening composition according to claim 1 further including not more than about 0.01% of each of butyl hydroxy anisole and butyl hydroxy toluene.

16. A stable, clear, liquid, pourable shortening composition free of visible crystals and stable at temperatures above 60° F. and exhibiting essentially constant volume baking responses in baking batters having prebaking temperatures from 60° to 75° F. consisting essentially of:
about 2% by weight of an acyl lactylic acid mixture containing about 20% acyl polylactylic acids having from 2 to 6 lactylic groups and the balance being acyl monolactic acids, the acyl moiety being principally palmityl and stearyl with a weight ratio of about 3 parts palmityl to about 2 parts stearyl;
about 1.3% by weight of a fatty acid mono-diglyceride;
about 1% by weight of a substantially saturated fatty acid mixture consisting principally of palmitic acid and stearic acid in the weight ratio of about 3 parts palmitic acid to about 2 parts stearic acid;
about .1% by weight of a polyglycerol ester of stearic, oleic and coconut oil fatty acids;
0% to about 0.01% by weight of butylated hydroxy anisole;
0% to about 0.01% of butylated hydroxy toluene; and
the balance of the composition being refined, unhydrogenated, finished soya bean oil.

17. The stable, clear, pourable shortening composition according to claim 16 wherein the fatty acid mono-diglyceride is a concentrate of a glycerol interesterified 80 to 86 I.V. cottonseed oil containing about 38% to 42% monoglyceride, about 48% to about 62% diglycerides and 0% to about 10% triglycerides, said concentrate not being completely solid at ambient temperature.

18. A method of preparing a stable, clear, liquid shortening composition which comprises the steps of:
adding to an edible vegetable oil about 1% to about 5% by weight of the finished composition an acyl lactylic acid mixture which contains from about 10% to about 30% of acyl polylactylic acids having from 2 to 6 lactylic groups, the remainder of the mixture being acyl mono-lactylic acid, the acyl moiety being principally palmityl and stearyl in the weight ratio of about 1 part to about 5 parts palmityl to about 1 part stearyl; about 0.5% to about 5% by weight of a fatty acid mono-diglyceride; about 0.25% to about 2% by weight of a substantially saturated fatty acid mixture containing principally palmitic acid and stearic acid in the weight ratio of about 1 part to about 5 parts palmitic acid to about 1 part stearic acid; and about .02% to 2% of a polyglycerol ester crystal inhibitor;
stirring the resulting mixture while heating it to a temperature between about 80° C. and about 100° C.; and
thereafter cooling the mixture to ambient temperature to obtain a stable, clear, pourable liquid shortening composition which will remain clear and stable at temperatures above 60° F.

References Cited
UNITED STATES PATENTS

| | | | |
|---|---|---|---|
| 2,132,393 | 10/1938 | Corth et al. | 99—123 |
| 2,266,591 | 12/1941 | Fekey et al. | 99—163 |
| 2,968,562 | 1/1961 | Houser | 99—118 |
| 3,144,341 | 8/1964 | Thompson | 99—123 |
| 3,224,882 | 12/1965 | Luck et al. | 99—118 X |

JOSEPH M. GOLIAN, Primary Examiner

U.S. Cl. X.R.

99—123